Figure 6:
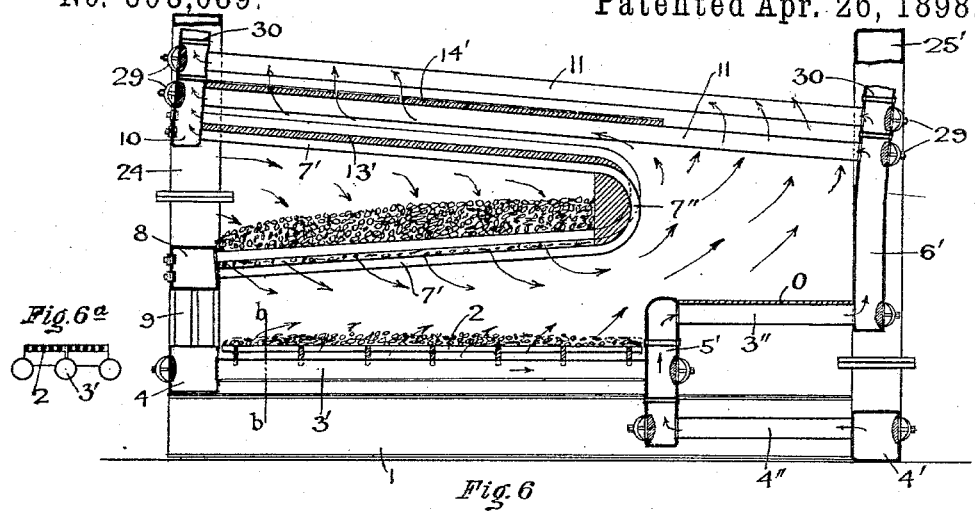

(No Model.) 4 Sheets—Sheet 1.
J. J. DE KINDER & A. C. WOOD.
BOILER AND FURNACE.
No. 603,089. Patented Apr. 26, 1898.
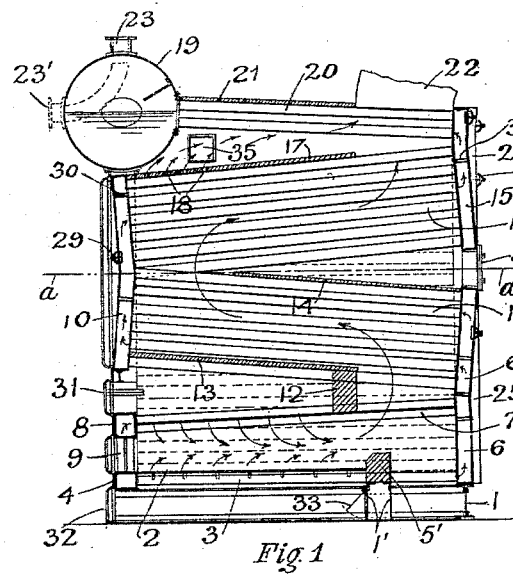
Fig. 1
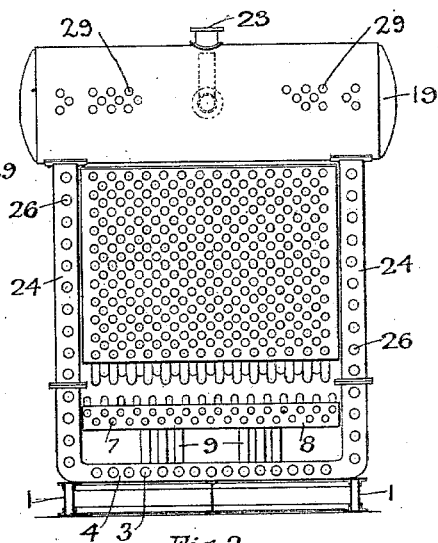
Fig. 2
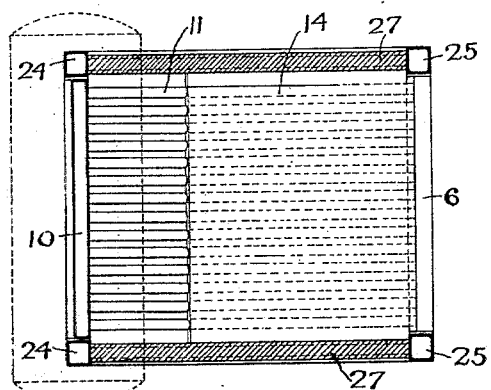
Fig. 3
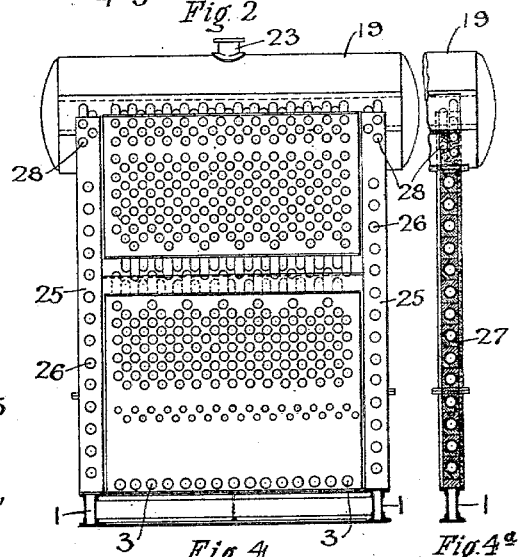
Fig. 4   Fig. 4ᵃ
Fig. 4ᵇ
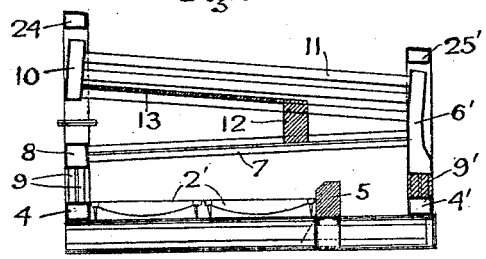
Fig. 5
WITNESSES:
J. C. McMahon
J. H. Mueller
INVENTORS
J. J. deKinder,
A. C. Wood,
By C. K. Butler
ATTORNEY
THE NORRIS PETERS CO., PHOTO-LITHO., WASHINGTON, D. C.

(No Model.) 4 Sheets—Sheet 2.

J. J. DE KINDER & A. C. WOOD.
BOILER AND FURNACE.

No. 603,089. Patented Apr. 26, 1898.

WITNESSES:
J. E. McMahon
J. H. Mueneal

INVENTORS
J. J. deKinder
A. C. Wood
By
C. N. Butler
ATTORNEY (No Model.) 4 Sheets—Sheet 3.

J. J. DE KINDER & A. C. WOOD.
BOILER AND FURNACE.

No. 603,089. Patented Apr. 26, 1898.

WITNESSES:

INVENTORS
J. J. de Kinder
A. C. Wood
By C. N. Butler
ATTORNEY (No Model.) 4 Sheets—Sheet 4.

J. J. DE KINDER & A. C. WOOD.
BOILER AND FURNACE.

No. 603,089. Patented Apr. 26, 1898.

WITNESSES:
J. B. McMahon
J. H. McNeal

INVENTORS
J. J. de Kinder
A. C. Wood
By C. N. Butler
ATTORNEY

UNITED STATES PATENT OFFICE.

JOSEPH JAMES DE KINDER AND ALBERT C. WOOD, OF PHILADELPHIA, PENNSYLVANIA.

BOILER AND FURNACE.

SPECIFICATION forming part of Letters Patent No. 603,089, dated April 26, 1898.

Application filed December 27, 1897. Serial No. 663,553. (No model.)

*To all whom it may concern:*

Be it known that we, JOSEPH JAMES DE KINDER and ALBERT C. WOOD, residents of the city of Philadelphia, State of Pennsylvania, have invented certain new and useful Improvements in Boilers and Furnaces, of which the following is a specification.

This invention relates more particularly to water-tube boilers, either land or marine, and to furnaces therefor. Its objects are to provide free upward passages throughout for the circulation of the water in process of heating and to secure the upward circulation of the gases of combustion along the course of the steam-generating tubes, to secure the maximum length of tube in a given length of setting, and to provide for the use of straight tubes only, whereby cleaning, repairs, and renewals can be effected with ease and any tube can be withdrawn without interfering with the others or with the construction generally; to provide a large combustion-chamber of sufficient space to secure the more complete combustion of the gases before they come in contact with the comparatively cold water-heating surfaces of the boiler; to provide an upper water-tube grate, on which the fuel may be fired, forming part of the water-circulating and steam-generating system, in combination with a lower grate which receives any coke or unburned fuel falling from the upper grate, providing means for coking the main body of the fuel on the upper grate; to avoid "dead" heating surfaces or pockets; to provide ample liberating surface in the steam drum or drums to secure freedom for expansion; to avoid the use of screw-joints and nuts, and generally to provide for economy of construction and operation with a high degree of efficiency.

The nature and construction of the invention are illustrated in the accompanying drawings, of which—

Figure 7:
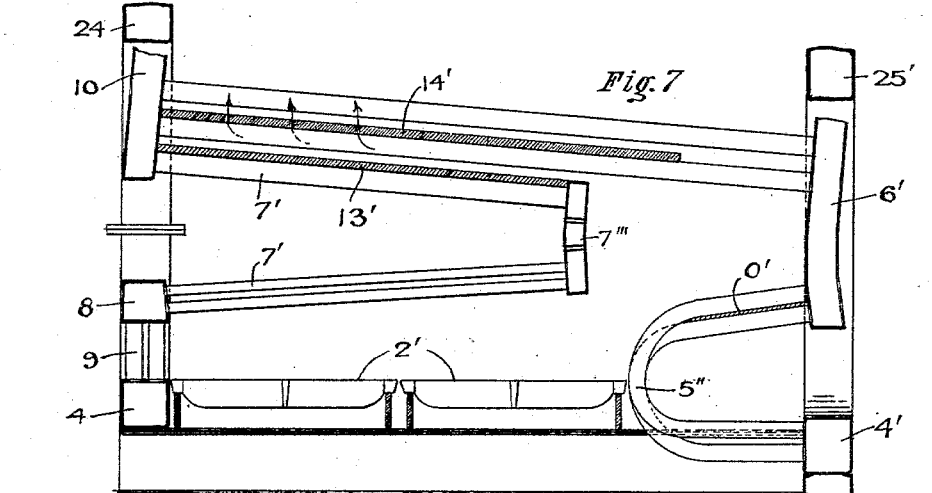
Figure 8:
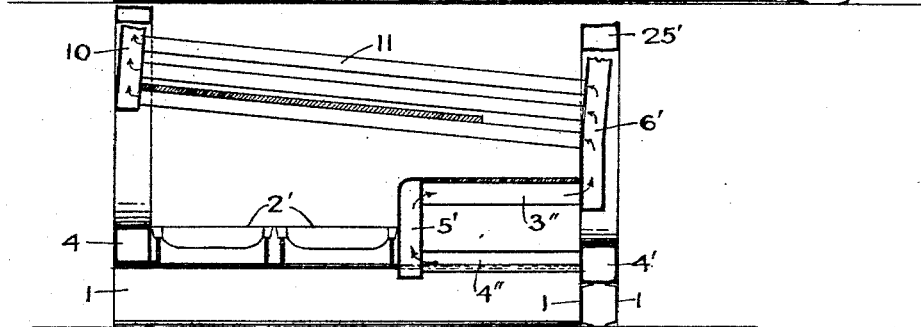
Figure 9:
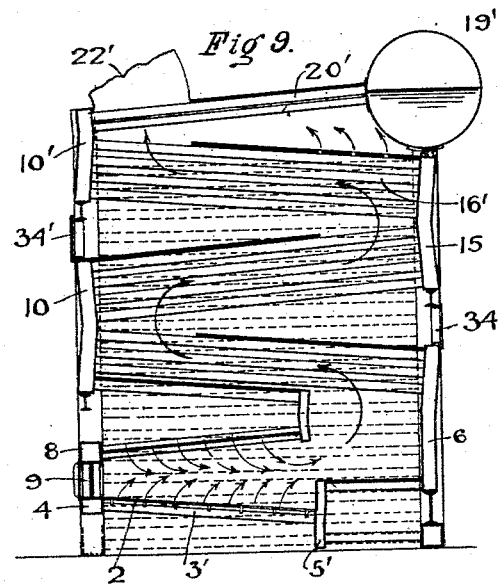
Figure 10:
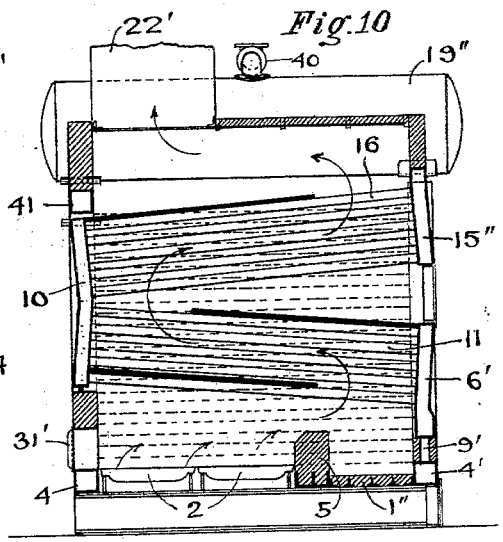
Figure 11:
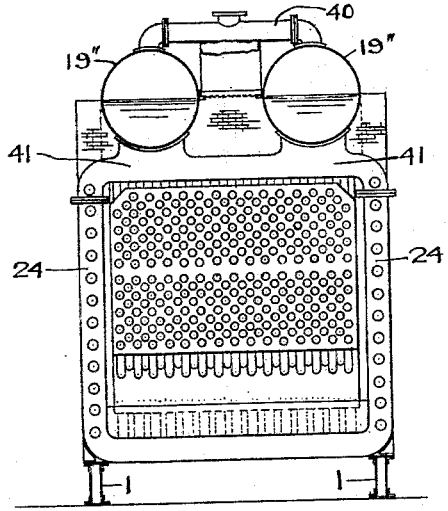
Figure 12:
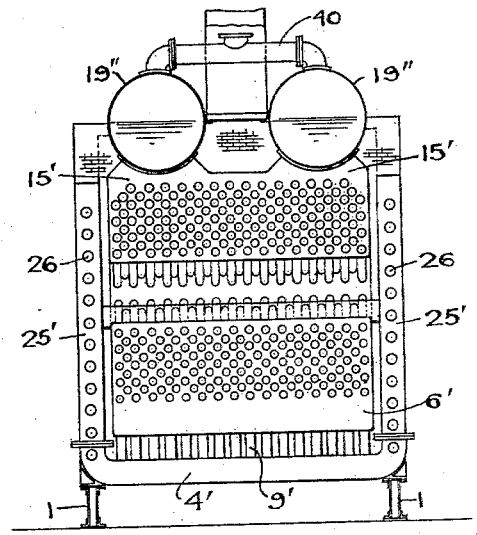
Figure 13:
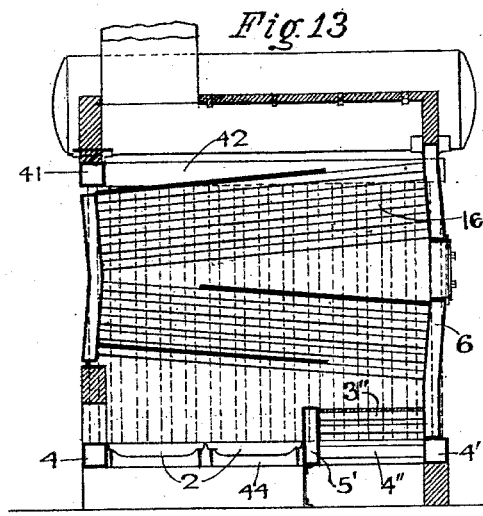
Figure 14:
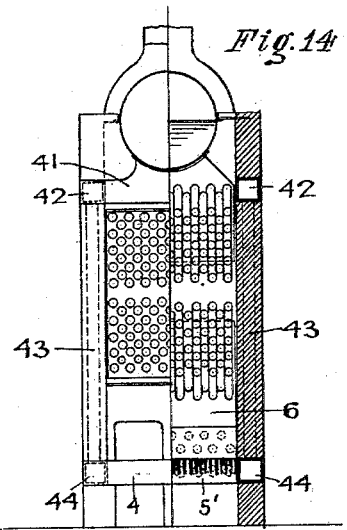
Figure 15:
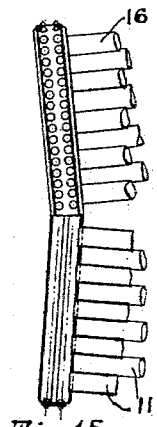
Figure 16:
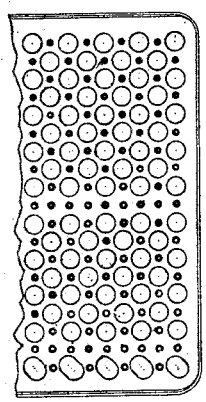
Figure 17:
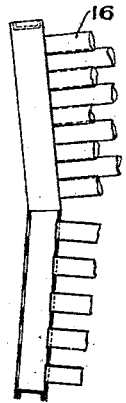
Figure 18:
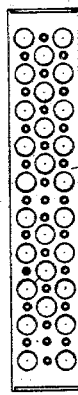
Figures 19, 20:
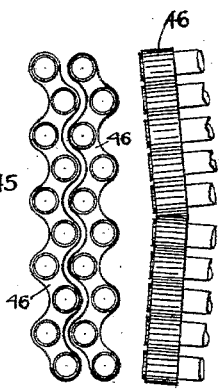
Figure 21:
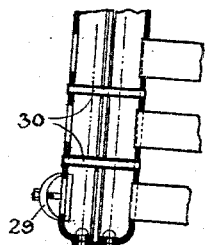
Figure 22:
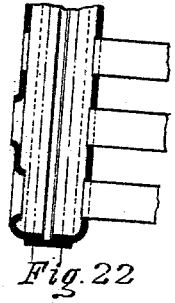

Figure 1 is a sectional side elevation of the invention. Fig. 2 is a full front elevation of the construction illustrated in Fig. 1. Fig. 3 is a horizontal plan view on the line $a\ a$ of Fig. 1. Fig. 4 is a rear elevation of the construction illustrated in Fig. 1. Fig. 4$^a$ is a sectional view of the side wall of the construction illustrated in Fig. 4. Fig. 4$^b$ is an enlarged detail of the construction shown in Fig. 4$^a$. Fig. 5 is a sectional side elevation of a specific construction of combustion-chamber and connections. Fig. 6 is a sectional side elevation of a second specific construction of combustion-chamber and connections. Fig. 6$^a$ is a partial sectional view on the line $b\ b$ of Fig. 6. Fig. 7 is a sectional side elevation of a third specific construction of a combustion-chamber and connections. Fig. 8 is a sectional side elevation of a fourth specific construction of combustion-chamber and connections, the upper water-tube grate being eliminated, provision being made for firing on the lower grate only. Fig. 9 is a sectional side elevation of a modified form of the invention. Fig. 10 is a sectional side elevation of a modified form of the invention in which provision is made for the use of one or more longitudinal drums. Fig. 11 is a full front elevation of the construction illustrated in Fig. 10. Fig. 12 is a full rear elevation of the construction illustrated in Fig. 10. Fig. 13 is a sectional side elevation of a modified form of the invention with vertical side-wall tubes and longitudinal water-boxes. Fig. 14 is a front elevation, partially in section, of the construction illustrated in Fig. 13. Fig. 15 is a side elevation, partially in section, and Fig. 16 is a front elevation, of an enlarged detail view of a form of header construction. Fig. 17 is a side elevation, partially in section, and Fig. 18 is a front elevation, of a modified form of header construction. Fig. 19 is a front elevation, and Fig. 20 is a side elevation, of and enlarged view in detail of a second modified form of header construction. Fig. 21 is a sectional view in detail, illustrating an arrangement of hand-hole caps and stay-bolts. Fig. 22 is a sectional view illustrating in detail a construction of the header hand-holes.

In the construction of the invention the foundation 1 for supporting the boiler and furnace is suitably formed of rolled-iron shapes. A grate 2 is supported upon water-tubes 3 and extends from the water-box 4 rearwardly through a bridge-wall 5, of brick or other non-combustible material, supported by a suitable sill 1' to the water-leg or back header 6. The water-leg 6 is connected by the tubes 7 with a second water-box 8, which traverses the front of the furnace and is connected with the water-box 4 by the tubes 9. The water-leg 6 is also connected with the front header 10 by the tubes 11. A bridge-wall 12, of brick or other non-combustible material, extends across the tubes 7, at right angles thereto and supported thereby. A baffle 13, of suitable non-combustible material, rests upon the bridge-wall 12 and the lower row of tubes 11, extending forward to the front header 10. Upon the top row of the tubes 11 is a second baffle 14, which extends forward from the water-leg 6. The front header 10 is also connected with a second water-leg or back header 15 by means of the tubes 16. Upon the top row of the tubes 16 and extending rearwardly from the front header 10 is a baffle 17, which is perforated at its forward end by apertures 18. The water-leg 15 is connected with the steam-drum 19 by means of one or more rows of tubes 20. A baffle 21 is supported by the tubes 20 and extends rearwardly to the breeching connection or smoke-box 22. The drum 19 may be provided with steam-outlets 23 or 23'. It is connected with the water-box 4 by means of the water-columns or downcomers 24, leading from the lowest part of the drum, near the ends thereof. The water-columns 24 are also connected with water-columns 25 by means of tubes 26. These tubes are incased by bricks 27, of non-conducting material, which are shaped to surround each tube by conjunction in the horizontal axial plane thereof, the tubes being thus capable of withdrawal without disturbing the surrounding wall. The water-columns 25 are also connected with steam-drum 19 by means of the tubes 28, the side walls between the top row of bricks 27 and the top baffle 21 being closed by a wall of magnesia or other non-conducting material, which incases the tubes 28.

The tubes described are all expanded in place and are made accessible by means of the hand-hole caps 29 for removal, repair, or cleaning.

The headers and water-legs are braced with hollow stay-bolts 30.

The firing is done upon the water-tubes 7, which between the water-box 8 and the bridge-wall 12 act as a grate-surface, the tubes being staggered, as illustrated in Fig. 2. The fuel is charged through the fire-door 31, and the products of combustion pass downward between the tubes, the solid portion that passes through the upper grate falling upon the grate 2. Air enters through the door 32, passes upward through the grate 2, completing the combustion of the solid fuel thereon, and, mingling or combining with the volatile gases, passes between the bridge-walls 5 and 12 along and between the tubes 7, 11, 16, and 20, escaping to the stack by the breeching 22, being deflected, as indicated by the arrows, by means of the baffles 13, 14, 17, and 21.

Perfect freedom for unequal expansion, due to different temperatures throughout the steam-generator, is secured, as particularly illustrated by the flexible connection of the tubes 7 with the water-box 4, through the box 8 and the tubes 9.

It will be observed that the angular arrangement of the separate banks of tubes and baffles provides a constantly-ascending course for the circulation of the water in process of heating and conducts the gaseous products of combustion along the path of the circulating water throughout the entire length of the tubing containing it, preventing the formation of dead heating spaces or pockets.

The accumulation of soot or cinders behind the bridge-wall 5 may be withdrawn through the door 33, the accumulation upon the baffle 14 may be withdrawn through the door 34, and the accumulation upon the baffle 17 may be removed through the door 35, the arrangement being such that no ordinary accumulation of soot or cinders will prevent the active contact of the heating-gases with the heating-surfaces of the boiler.

The water-level is carried near the center of the drum 19. In its course of circulation through the boiler the water passes downward through the columns 24 to the box 4, thence to the rear water-leg or header 6 through the tubes 3 9 7 and water-box 8, thence through the tubes 11 to the front header 10, thence through the tubes 16 to the rear header 15, and thence through the tubes 20 back to the drum 19. A portion of the water passing down the column 24 flows through the tubes 26 of the side walls into the rear water-columns 25, thence through the tubes 28 back to the drum 19. The downflow of water leaves the lowest point of the drum and is returned near the water-level thereof.

In the modified construction illustrated in Fig. 5 the grate 2' rests upon the foundation through the medium of bearing-bars extending between the side walls of the furnace. A water-box 4', resting upon the foundation, communicates with the columns 25' and may communicate with the water-leg 6 by means of the tubes 9'.

In the modified construction illustrated in Fig. 6 the tubes 3' connect the water-box 4 with the combined bridge-wall and water-box 5', which is connected with the water-box 4' by the tubes 4'', and with the water-leg 6' by the tubes 3'', supporting a baffle 0, the flow of water through the several passages being indicated by the arrows. The upper grate is formed of one or more rows of water-tubes connected with the water-box 8 and extended rearwardly therefrom to the point 7'', where they are bent around and returned to connect with the front header 10. These tubes are preferably arranged in two rows and staggered, so that a vertical projection of each tube covers the corresponding space of the contiguous tubes in the other row, permitting the insertion of a baffle 13' as a roof for the fire-box. A bridge-wall is formed at 7'' by the close contact of the tubes, which may be supplemented by a wall of non-combustible material, as shown in cross-section. A perforated baffle 14', extending rearwardly from the header 10 and supported by the bottom row of tubes 11, serves to direct the heated gases into active contact with the water-tube surfaces.

The modified construction illustrated in Fig. 7 substitutes bent tubes 5'', (connecting the water-box 4' with the water-leg 6',) which are arranged as in the case of the upper grate-tubes of Fig. 6, the bent portions of the tubes lying close together to form a bridge-wall at the rear of the grate 2' and the straight portions being staggered. A baffle 0' lies between the upper rows of the bent tubes 5''. The bridge-wall 7''' is also a water-leg which communicates with the tube 7'.

In the construction illustrated in Fig. 8 the upper water-grate and connections are omitted, the firing being done upon the grate 2'.

In the modification illustrated in Fig. 9 the lower grate 2 and water-tubes 3' decline rearwardly. An additional bank of tubes 16' leads from the header 15, and an additional header 10' connects the tubes 16' with the tubes 20', which lead to the drum 19', placed at the rear of the boiler, the breeching 22' being in the front and an additional door 34' being provided for cleaning purposes.

In the form of the invention illustrated in Figs. 10, 11, and 12 a special feature of the construction consists of the use of one or more steam-drums 19'', placed on either side of the boiler and extending from the front to the rear thereof. The upper or steam spaces of these drums are connected by an equalizing-pipe 40. The lower or water spaces communicate with the water-box 41, which communicates with the columns 24, the heated water entering the drum by the way of the water-leg 15'. It will be observed that the water-columns 25', which are connected with the water-columns 24 by the side-wall tubes 26, do not communicate directly with the steam-drum 19'', but communicate with a water-box 4', which is connected by tubes 9' with the water-legs 6', thence through the tubes 11, front header 10, tubes 16, and water-leg 15'' to the drum or drums 19''. Provision is here made for firing on the plain bottom grate 2 through the fire-door 31', omitting the upper water-tube grate and connections. The bridge-wall 5 and the tiling or floor 1'', extending rearwardly therefrom to the water-box 4', may be suitably supported by T-irons extending between the side walls and resting on the foundation.

In Figs. 13 and 14 is shown a construction which employs one or more steam-drums extending from the front rearwardly and communicating with the water-leg 41, which in turn communicates with horizontal rearwardly-extending water-boxes 42, which communicate through the vertical side-wall tubes or columns 43 with the lower horizontal and rearwardly-extending water-boxes 44. The water-boxes 44 communicate in front with the water-box 4 and in the rear with the water-box 4', the latter communicating with the water-leg 6 through the tubes 4'' 3'' and the water-box 5'.

The partial side and front views of Figs. 15 and 16 illustrate a form of built-up header or water-leg that may be used, the construction comprising a box communicating with all of the tubes 11 and 16.

The partial side and front views of Figs. 17 and 18 show a construction of header in which a desired number of vertical rows of tubes 11 and 16 communicate with an independent section of the complete header, the independent sections or subheaders 45 being assembled together to form a complete header composed of laterally non-communicating chambers.

The partial front and side views of Figs. 19 and 20 show a construction of header in which the vertical rows of tubes are connected by pairs with a tortuous water-leg 46, which legs are wholly independent of each other.

The sectional view shown in Fig. 21 illustrates in detail a construction of hand-holes, hand-hole caps, and stay-bolts.

The sectional view illustrated in Fig. 22 shows in detail a method of forming and reinforcing hand-holes.

The arrangement of the tubes and headers and the mode of handling the products of combustion afford easy facility by means of the doors 34 and 34' for examination, cleaning, and adjustment within the construction even while the boiler and furnace are in operation. By access through these openings between the headers 10 and 10' and 6 and 15 the baffle-plates may readily be adjusted, and the passage of the products of combustion through the system and through the escape between the vertical planes of the front and rear headers may readily be controlled without stopping the operation.

Having thus described our invention, we claim as new—

1. In the combination of a boiler and furnace, a drum, a water-column leading downward from said drum, two or more superposed oppositely-inclined banks of ascending tubes having communication with said water-column and leading by constantly-ascending passages to said drum, and means for directing the gaseous products of combustion along the courses of said banks of tubes and in a constantly-ascending direction, substantially as specified.

2. In the combination of a boiler and furnace, a drum, one or more water-columns leading downward from said drum, a water-leg or header, water-passages connecting said water column or columns and header, a second header and a bank of ascending tubes leading thereto from said first header, a third header and a bank of constantly-ascending tubes leading thereto from said second header, ascending water-passages connecting said third header and drum, and means for directing the gaseous products of combustion along the said ascending water-courses and in a constantly-ascending direction, substantially as specified.

3. In the combination of a boiler and furnace, a drum, water-columns leading downward from said drum, a horizontal water-box connecting said water-columns, a water-leg or header and water-passages leading thereto from said water box and columns, a second header and a bank of ascending tubes leading thereto from said first header, a third header and a bank of ascending tubes leading thereto from said second header, ascending water-passages connecting said third header and drum, and means for directing the gaseous products of combustion along the said ascending water-courses and in a constantly-ascending direction, substantially as specified.

4. In the combination of a boiler and furnace, a drum, water-columns leading downward from said drum, a horizontal water-box connecting said water-columns, a water-leg or header and water-passages leading thereto from said water box and columns, a second header and a bank of ascending tubes leading thereto from said first header, a third header and a bank of ascending tubes leading thereto from said second header, ascending water-passages connecting said third header and drum, water-columns leading upward to and communicating with said drum, and horizontal side-wall tubes connecting said downward water-columns with said upward water-columns, substantially as specified.

5. In the combination of a boiler and furnace, a drum, water-columns leading downward from said drum, a horizontal water-box connecting said water-columns, a water-leg or header, a grate comprising water-tubes leading from said water-box to said header, a second header and a bank of ascending tubes leading thereto from said first header, a third header and a bank of ascending tubes leading thereto from said second header, ascending water-passages leading from said third header to said drum, and means for directing the gaseous products of combustion along the said ascending water-courses and in a constantly-ascending direction, substantially as specified.

6. In the combination of a boiler and furnace, a drum, water-columns leading downward from said drum, a horizontal water-box connecting said water-columns, a water-leg or header, a grate comprising water-tubes leading from said water-box to said header, a second header and a bank of ascending tubes leading thereto from said first header, a third header and a bank of ascending tubes leading thereto from said second header, water-columns leading upward to and communicating with said drum, and horizontal side-wall tubes connecting said downward water-columns with said upward water-columns, substantially as specified.

7. In the combination of a boiler and furnace, a drum, water-columns leading downward from said drum, a horizontal water-box connecting said water-columns, a water-tube grate, a water-leg communicating with said water-tube grate and forming a bridge-wall therefor, water-passages connecting said horizontal water-box with said water-tube grate and water-leg, a header connected with said water-tube grate, and ascending water-passages leading from said header to said drum, substantially as specified.

8. In the combination of a boiler and furnace, a drum, a water-tube grate and water-passages leading thereto from said drum, a water-leg communicating with said water-tube grate and forming a bridge-wall therefor, a header connected with said water-leg and one or more banks of ascending tubes leading therefrom to said drum.

9. In the combination of a boiler and furnace, a drum, an upper water-tube grate and water-passages leading thereto from said drum, a lower grate comprising water-tubes, water-passages leading to said lower water-tube grate from said drum, a header connected with said water-tube grates, and one or more banks of ascending tubes leading therefrom to said drum.

10. In the combination of a boiler and furnace, a drum, a water-tube grate, water-passages leading to said water-tube grate from said drum and water-passages leading therefrom to said drum, a bridge-wall for said grate, a lower grate comprising water-tubes, a water-leg communicating with said lower water-tube grate and forming a bridge-wall therefor, water-passages leading to said lower water-tube grate from said drum, and water-passages leading from said water-leg to said drum, substantially as specified.

11. In the combination of a boiler and furnace, a drum, water-columns leading therefrom, a water-box connecting said water-columns, a grate, a water-leg forming a bridge-wall for said grate, water-passages leading from said water-columns and water-box to said water-leg, a header and water-tubes leading to said header from said water-leg, a second header and a bank of tubes leading thereto from said first header, a third header and a bank of tubes leading thereto from said second header, and water-passages leading from said third header to said drum, substantially as specified.

12. In the combination of a boiler and furnace, a drum, one or more passages leading downward from said drum, a header communicating with said water passage or passages, a bank of ascending tubes having their lower ends connected with said header, a second header connected with the upper ends of said bank of tubes, a second bank of ascending tubes having their lower ends connected with said second header, a third header connected with the upper ends of said second bank of ascending tubes and located above said first header, passages connecting said third header with said steam-drum, means for directing the products of combustion into active contact with said tubes and headers, and an escape therefor located between the vertical planes of said second and third headers.

13. In the combination of a boiler and furnace, a header, a bank of ascending tubes having their lower ends connected with said header, a second header connected with the upper ends of said bank of ascending tubes, a second bank of ascending tubes having their lower ends connected with said second header, a third header located above said first header and connected with the upper ends of said second bank of ascending tubes, a passage between said first and third headers, means of directing the gaseous products of combustion into active contact with said tubes and headers, and an escape therefor located between the vertical planes of said second and third headers, as specified.

In testimony whereof we have hereunto set our hands.

JOSEPH JAMES DE KINDER.
ALBERT C. WOOD.

Witnesses:
J. E. McMahon,
J. H. McNeal.